UNITED STATES PATENT OFFICE.

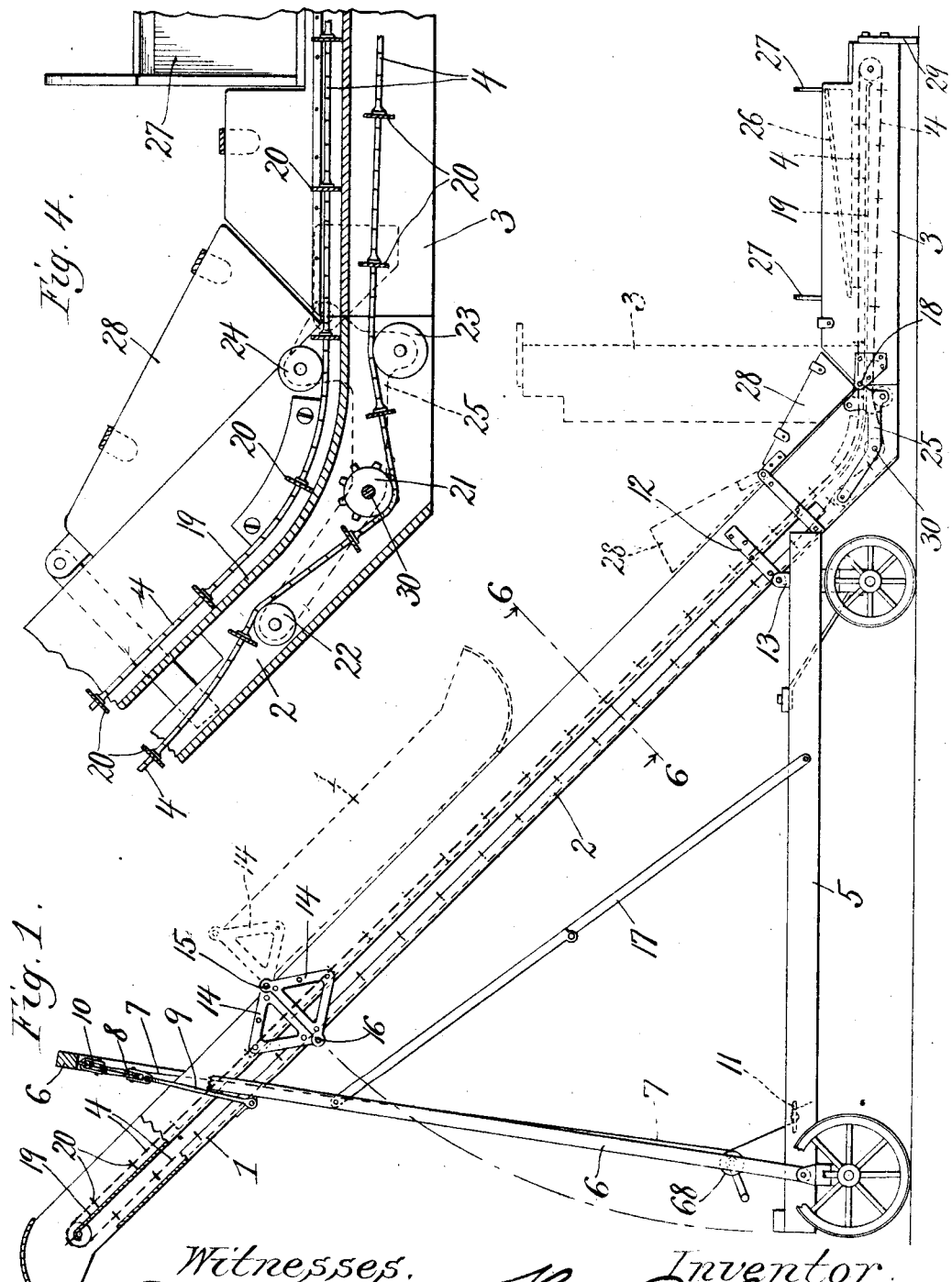

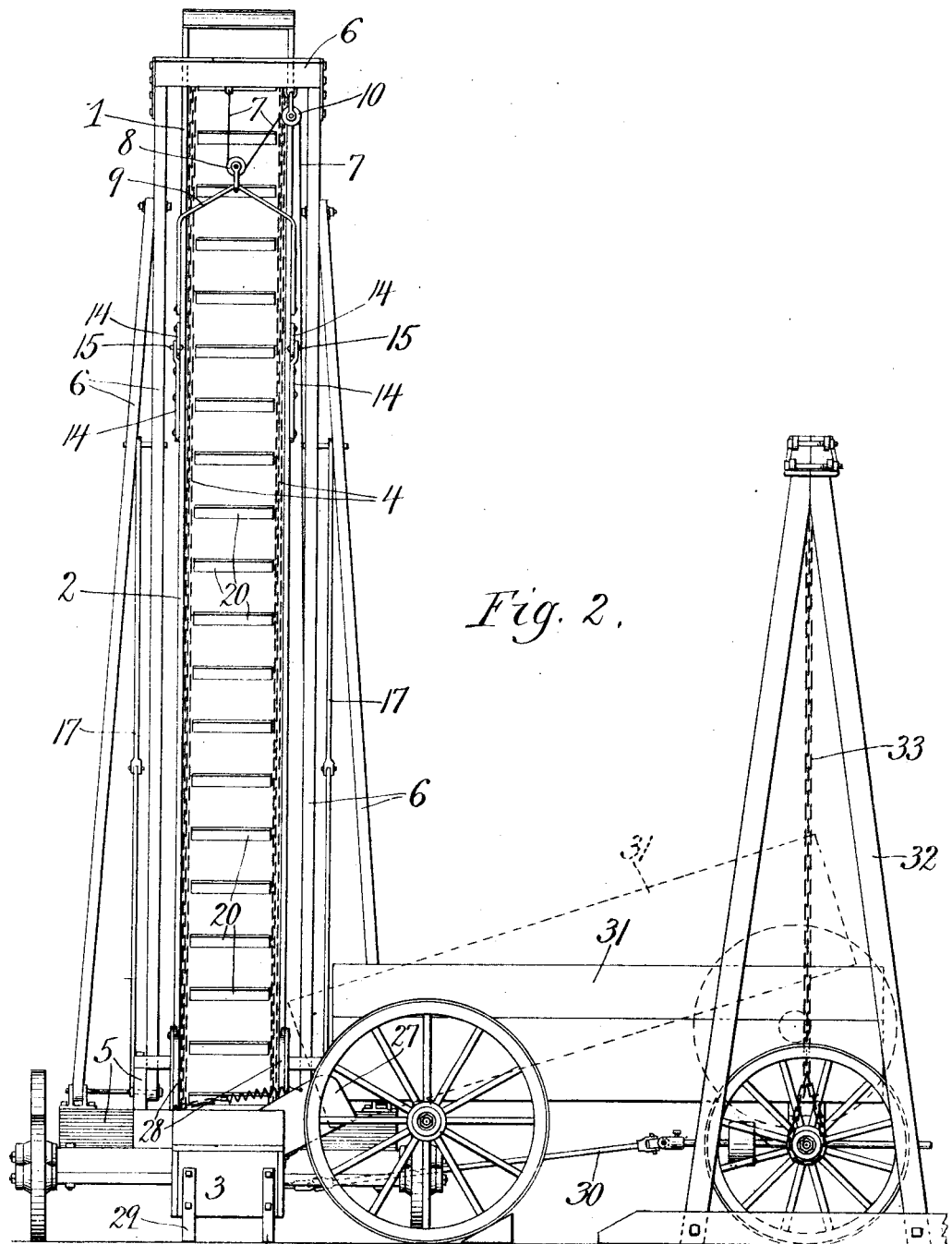

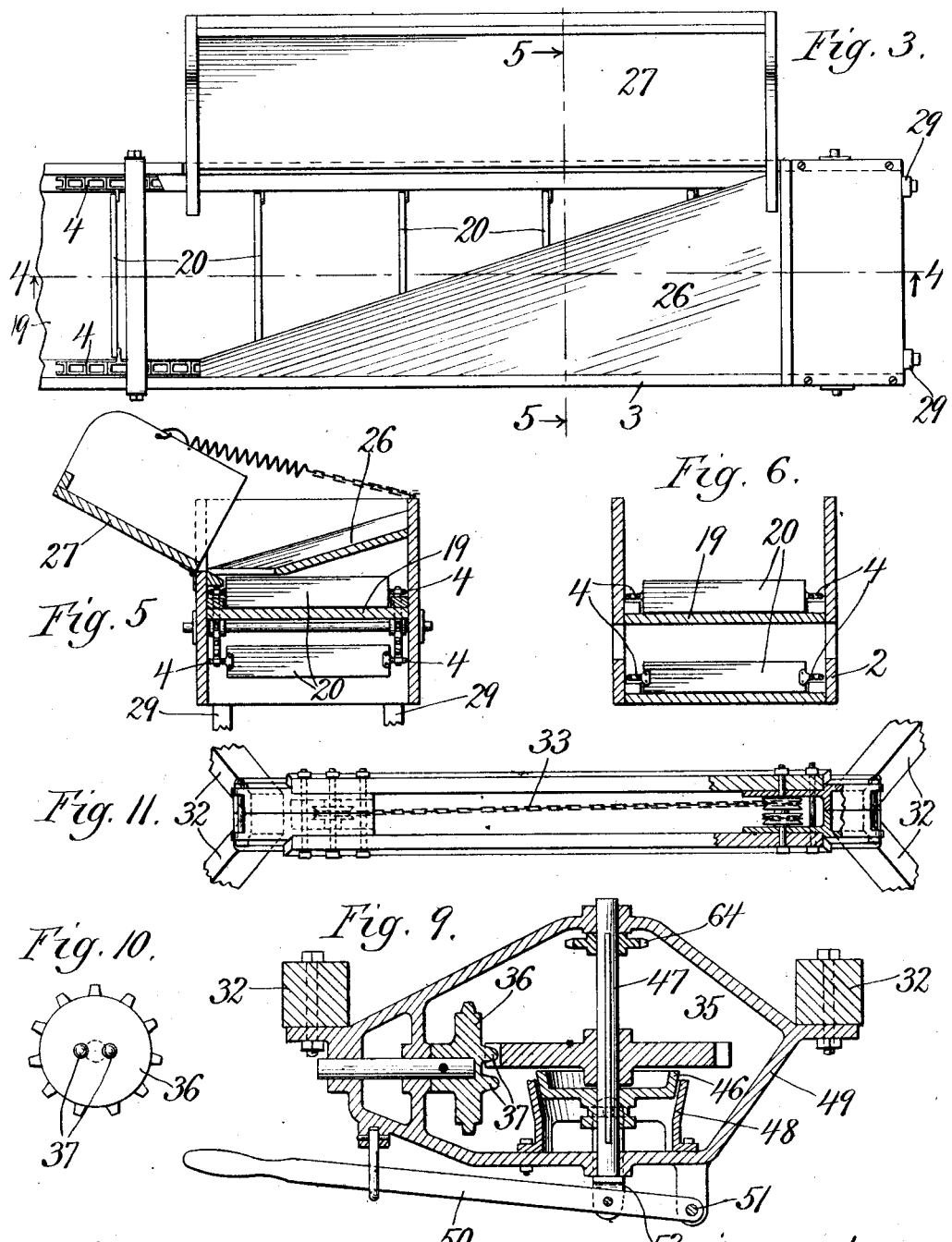

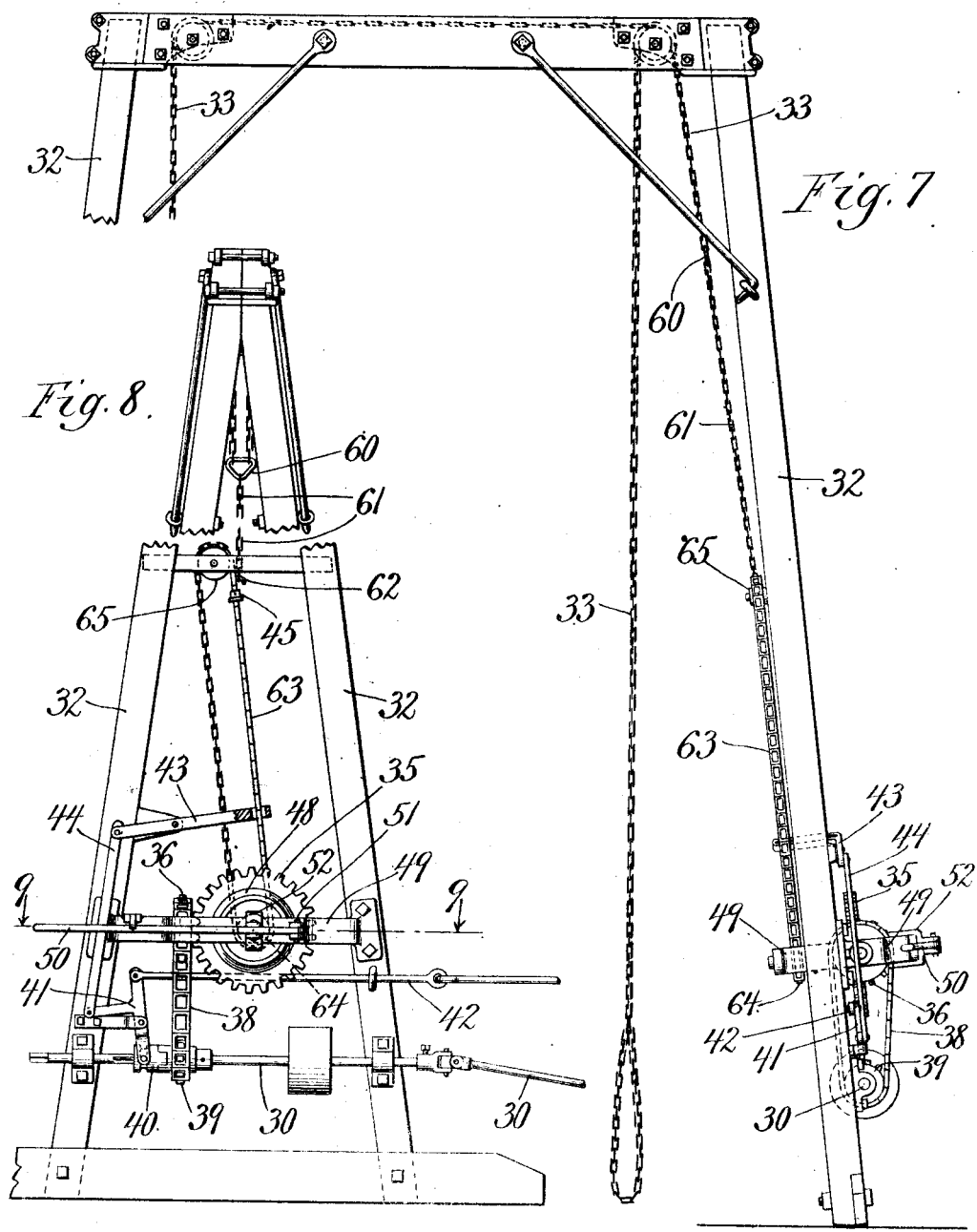

HENRY P. HARPSTRITE, OF MAROA, ILLINOIS.

GRAIN-HANDLING DEVICE.

1,031,850.

Specification of Letters Patent.

Patented July 9, 1912.

Application filed June 22, 1908. Serial No. 439,644.

*To all whom it may concern:*

Be it known that I, HENRY P. HARPSTRITE, a citizen of the United States, residing at Maroa, in the county of Macon and State of Illinois, have invented a certain new and useful Improvement in Grain-Handling Devices, of which the following is a specification.

This invention relates to grain handling devices, and has for its object to provide a new and improved apparatus of this description.

The invention is illustrated in the accompanying drawings, wherein—

Figure 1 is a side elevation of the elevating apparatus; Fig. 2 is an end view of the elevating apparatus showing the vehicle from which the grain is discharged and the apparatus for controlling it; Fig. 3 is a plan view of the horizontal portion of the elevating apparatus; Fig. 4 is a sectional view of a portion thereof at the point where the two sections join; Fig. 5 is a sectional view taken on line 5—5 of Fig. 3; Fig. 6 is a sectional view taken on line 6—6 of Fig. 1; Fig. 7 is a view of the vehicle-controlling apparatus; Fig. 8 is an end view of the vehicle-controlling device shown in Fig. 7; Fig. 9 is a sectional view taken on line 9—9 of Fig. 8; Fig. 10 is a view of the sprocket wheel shown in Fig. 9; Fig. 11 is a top view of the device shown in Fig. 7.

Like letters refer to like parts throughout the several figures.

The device is adapted to be used for unloading and elevating corn or other grain or material, and delivering it to a desired point. The elevating device as illustrated in Fig. 1 is made up of a plurality of sections 1, 2 and 3 which are hinged together in some suitable manner, there being a continuous conveyer 4 running along all of these sections. The sections 1 and 2 when the device is in operation are preferably in an inclined position, while the section 3 is arranged in a substantially horizontal position. The elevating device as herein shown is mounted upon a truck 5 so that it may be readily moved from place to place. Pivotally connected to the truck is a support 6. The elevating device is suspended from this support in any desired manner, as by means of the rope 7 which is fastened to the support (see Fig. 2), and which passes around a pulley 8 attached to a bracket 9 on the elevating device, and thence around a pulley 10 connected with the support, and thence to a windlass 68 and cleat or the like 11 on the truck. By means of this rope the elevating device can be lowered onto the truck, or raised to the position shown in Fig. 1. The device is connected to the truck by means of the pieces 12 hinged to the parts 13 on the truck. Sections 1 and 2 of the elevating device are hinged together by the triangular hinged parts 14 which are fastened together by bolts 15, 16. When it is desired to fold the parts, the bolts 16 are removed and the section 1 folded upon the section 2. Hinged braces 17 connect the support 6 with the truck. This support forms what may be called a folding derrick.

The material is discharged into section 3 of the elevating device, and is there taken up by the continuous conveyer. This section 3 is at an angle to the remainder of the elevating device. An arrangement is provided for permitting the movement of the continuous conveyer in all the various positions of the section 3. This section is hinged to the other part of the elevating device at 18 so that it can be folded up when the device is not in use. The upper part of the continuous conveyer passes along the floor 19, the grain or other material being moved along this floor by the flights 20. At the end of section 2 the chain of the conveyer passes beneath the driving sprocket 21 above the guiding wheels 22, 23. The wheels 22 and 23 act as guides. There is also a guiding device 24 for the upper part of the conveyer.

The various wheels or guides may be supported in any desired manner, and as herein shown are supported upon the brackets 25, one on each side of the elevating device. The section 3 is provided on the interior with an inclined receiving face 26 at one side, and a chute 27 at the other side. The inclined receiving face covers a part of the conveyer and prevents too much material from being discharged thereon. This may be termed a limiting device for limiting the feed to the conveyer. Associated with the section 2 are the movable side boards 28 which may be moved out of the way as shown in dotted lines in Fig. 1 when it is desired to fold the sections of the elevating device. The section 3 is preferably provided with a supporting leg 29. The driving sprocket 21 may be actuated in any desired manner, as, for example, by the driving shaft 30 driven from any suitable source of power. It will be understood, of course, that there are two of these driving sprockets, one on each side of the device.

The material is dumped into the section 3 so as to be acted upon by the conveyer. As shown in Fig. 2 a vehicle 31 is shown in position ready to discharge grain into section 3. Some suitable arrangement is provided for automatically discharging this grain. As herein shown means is provided for lifting the front end of the vehicle so that the material will slide out at the rear end. A frame 32 is arranged in proper position with relation to the vehicle, said frame being provided with a flexible lifting device 33 which is passed over the hub of the front wheels (see Fig. 2), and between the bed and felly of the wheel, there being means provided for operating the flexible lifting device so as to lift the vehicle to the proper position. As herein illustrated there are two flexible lifting devices 33 which pass over pulleys at the top of the frame 32, one going to each wheel. These flexible lifting devices are connected at 60 to a belt or chain 61. Connected with this chain at 62 is a detachable chain or belt 63 which engages a sprocket wheel 64, and is connected to the end of the chain 61. The chain 61 engages a wheel or pulley 65 which may in this instance be a plain wheel. The sprocket wheel 64 is connected with a gear wheel 35. When this construction is used the chain 61 need only be a plain chain as the driving is done by the detachable belt 63 which is arranged to engage the teeth on the driving sprocket 64. A socket wheel 36 is mounted in proximity to the gear 35, and is provided with engaging projections 37 which engage the teeth of the gear as sprocket wheel 36 is rotated so as to rotate the gear and wind the flexible lifting devices. The sprocket wheel 36 is driven in any desired manner, as by means of the belt 38, sprocket wheel 39 and shaft 30. Some means is provided for connecting and disconnecting the sprocket wheel 36 from the driving shaft. The arm 43 has a part in the path of an engaging part 45 on the detachable chain so that when the detachable chain has been moved to lift the front end of the wagon the proper amount the part 45 will strike the arm 43 so as to throw the parts out of gear and stop the further upward movement of the wagon. Some suitable means is provided for controlling the return movement of the wagon. As herein shown a frictional braking element 46 is feathered to the shaft 47 of the gear 35. A coöperating frictional element 48 is fastened to the frame 49. Some means is provided for moving the two elements relatively to bring them into frictional contact. As shown in Fig. 9 a controlling handle 50 is pivoted at 51 to the frame and is provided with connecting pieces 52 which connect with the frictional element 46 in the usual manner so that it may be free to rotate and may yet be moved longitudinally along the shaft. By moving this handle it will be seen that the shaft 47 and gear 35 and sprocket wheel 64 may be controlled to either hold the wagon in any desired position, or lower it slowly. It will be seen that when the sprocket wheel 64 is rotated clock-wise the detachable chain 63 moves downwardly pulling with it the upper part of the chain 61, thus pulling upon the flexible lifting device 33 so as to lift the vehicle.

The use and operation of my invention are as follows: When the elevating device has been moved to the desired position by means of the truck 5 the sections of such elevating device are unfolded and the device is raised by means of the folding derrick, rope 7 and windlass 68 to the position shown in full lines in Fig. 1. The lifting device or jack for the front end of the vehicle or wagon is then placed in proper position and the vehicle moved into proper relation with the section 3 of the elevating device. The continuous conveyer is then set in motion. The clutch member 40 is then moved by means of the controlling device 42 to engage the sprocket wheel 39. This rotates the gears 36 and 35 and the sprocket wheel 64, and winds up the flexible lifting devices which are connected to the hubs of the front wheels of the vehicle. The vehicle is then inclined so that the material therein will slide out into section 3 of the elevating device where it is engaged by the flights and moved upwardly to the point of delivery. The receiving face 26 receives the superfluous material and prevents the elevating device from being clogged. When the part 45 engages the arm 43 the clutch member 40 is moved to throw the parts out of gear and stop the further upward movement. At this time the handle 50 is moved so as to bring the clutch members 46 and 48 into frictional contact so that the lowering of the front end of the vehicle may be properly controlled.

It will be seen that there is here provided a portable elevator and grain dump which may be easily and quickly placed in its operative position, and which will cheaply and efficiently handle the grain or other material in connection with which it is used. The single continuous conveyer has a part in each of the sections of the elevating device, and the arrangement is such that this conveyer will work when section 3 is in any of its various positions.

I claim:

1. A grain handling device comprising an elevating device having two sections fastened together by a pivotal connection, one of said sections adapted to be held in an inclined position when the device is in operation, the other section fastened thereto so as to be supported thereby, and a continuous conveyer passing from one section to the other and movable side boards connected with one of said sections at the end thereof adjacent to the other section.

2. A grain handling device comprising an elevating device made up in sections hinged together and at an angle to each other when the elevating device is in use, a continuous conveyer passing from one section to the other, and a sprocket wheel and separate rotatably mounted guiding devices for the conveyer at the point where the conveyer passes from one hinged section to the other, said guiding devices on opposite sides of said sprocket wheel.

3. A grain handling device comprising an elevating device having two sections hinged together, and at an angle to each other when the device is in operation, one of said sections adapted to receive the material handled, a continuous conveyer passing from one section to the other, an operating chain therefor, a sprocket wheel at the point where the chain passes from one hinged section to the other, and two guiding devices for the lower loop of said chain one on each side of said sprocket wheel.

4. A grain handling device comprising an elevating device having two sections hinged together and at an angle to each other when the device is in operation, one of said sections adapted to receive the material handled, a continuous conveyer passing from one section to the other, an operating chain therefor, a sprocket wheel at the point where the chain changes direction, two guiding devices for the chain one on each side of said sprocket wheel, said sprocket wheel and guiding devices engaging the lower portion of the chain, and another guiding device engaging the upper portion of the chain.

5. A grain handling device comprising an elevating device having two sections hinged together and at an angle to each other when the device is in operation, one of said sections adapted to receive the material handled, a continuous conveyer passing from one section to the other, an operating chain therefor, a sprocket wheel at the point where the chain changes direction, two guiding devices for the chain one on each side of said sprocket wheel, said sprocket wheel and guiding devices engaging the lower portion of the chain, another guiding device engaging the upper portion of the chain, and a bracket to which all of said guiding devices are attached.

6. An elevating device comprising two sections hinged together, one section adapted when in operation to be in a substantially horizontal position, and the other section in an inclined position, the horizontal section supported upon the inclined section, and a single continuous conveyer having a portion thereof in each section, said sections and portions of the conveyer therein adapted to be folded together while the device is being moved from one place to another, the lower section having an inclined receiving face which covers a part of the conveyer, said inclined receiving face located above the conveyer.

7. A grain handling device comprising an elevating device made up of a plurality of sections hinged together, a single continuous conveyer having a portion thereof in each section, said sections and the portions of the conveyer therein adapted to be folded together, and a truck to which one of said sections is pivotally connected, the section pivoted to said truck having a projecting end which projects beyond the truck and below the frame thereof when the device is in use, said conveyer completely inclosed by said sections.

8. A grain handling device comprising an elevating device made up of a plurality of sections hinged together, a single continuous conveyer having a portion thereof in each section, said sections and the portions of the conveyer therein adapted to be folded together, a truck to which one of said sections is pivotally connected, and a folding derrick on said truck by means of which the elevating device may be raised, and lowered, from its portable position to its operative position, and means for connecting said folding derrick with the upper end section of the elevating device.

9. A grain handling device comprising an elevating device made up of sections hinged together, a continuous conveyer, a portion of which is associated with each section, one of said sections arranged to receive the material to be handled, an inclined receiving face in said latter section which covers a portion of the conveyer and which is adapted to receive the material discharged into the elevating device and prevent clogging of the conveyer.

10. A grain handling device comprising an elevating device, a continuous conveyer forming part thereof, an inclined bottom at the receiving end of said grain handling device and adapted to regulate the feed of the material to the conveyer and prevent over-feeding.

11. A grain handling device comprising an elevating device made up of sections hinged together, a continuous conveyer associated with said sections, the end section acting as the receiving portion of the device and adapted to be folded upon the other section so as to be supported thereby, and means for operating said conveyer when said end section is in any of its various positions, the lower section of the elevating device having an inclined receiving face at one side and a chute at the other side.

12. A grain handling device comprising an elevating device made up of a plurality of sections hinged together, a single continuous conveyer having a portion thereof in each section, a floor between the upper and lower parts of said continuous conveyer, said floor curved at the lower end of one of said sections.

HENRY P. HARPSTRITE.

Witnesses:
  WILL SCHENCK,
  S. A. FRIEDMAN.